United States Patent
Ellis et al.

(10) Patent No.: US 8,117,017 B2
(45) Date of Patent: Feb. 14, 2012

(54) ENGINE PERFORMANCE MODEL

(75) Inventors: Sean P Ellis, Oakwood (GB); Mark G Challener, Breadsall (GB)

(73) Assignee: Rolls-Royce PLC, London (GB)

( * ) Notice: Subject to any disclaimer, the term of this patent is extended or adjusted under 35 U.S.C. 154(b) by 772 days.

(21) Appl. No.: 12/078,711

(22) Filed: Apr. 3, 2008

(65) Prior Publication Data

US 2009/0012762 A1    Jan. 8, 2009

(30) Foreign Application Priority Data

Jul. 4, 2007   (GB) .................................... 0712980.2

(51) Int. Cl.
    *G06F 9/455* (2006.01)
(52) U.S. Cl. ...................... 703/7; 703/6; 703/9; 701/100
(58) Field of Classification Search .................. 703/7, 9, 703/18, 6; 701/100, 29; 60/773, 204, 778, 60/775, 772; 702/185; 714/25; 73/116.03; 700/268, 34, 28; 436/55

See application file for complete search history.

(56) References Cited

U.S. PATENT DOCUMENTS

| | | | | |
|---|---|---|---|---|
| 4,189,939 A | * | 2/1980 | West et al. ................. | 73/116.03 |
| 4,215,412 A | * | 7/1980 | Bernier et al. .............. | 701/100 |
| 5,394,689 A | * | 3/1995 | D'Onofrio .................. | 60/204 |
| 5,551,227 A | * | 9/1996 | Moulton et al. ............ | 60/778 |
| 7,020,793 B1 | | 3/2006 | Hsieh | |
| 2003/0088809 A1 | * | 5/2003 | Gulati et al. ............... | 714/25 |
| 2004/0123600 A1 | * | 7/2004 | Brunell et al. ............. | 60/773 |
| 2004/0177618 A1 | * | 9/2004 | Placko et al. .............. | 60/775 |

(Continued)

FOREIGN PATENT DOCUMENTS

GB        2 399 187 A       9/2004

OTHER PUBLICATIONS

Igreja et al., "Adaptive non-linear control of distributed collector solar field", 1989.*

(Continued)

*Primary Examiner* — Kandasamy Thangavelu
(74) *Attorney, Agent, or Firm* — Oliff & Berridge, PLC

(57) ABSTRACT

A method of constructing a piecewise linear engine performance model, comprises the steps of:
  (a) providing a non-linear engine performance model which iteratively calculates engine performance variables y from a plurality of sub-models, each sub-model representing the performance of a component of the engine;
  (b) defining a plurality of engine power conditions, each engine power condition being defined by one or more engine state variables x;
  (c) for each of the engine power conditions, using the non-linear engine performance model to determine partial derivatives δy of the engine performance variables y with respect to engine control variables u and with respect to the engine state variables x, the values of the partial derivatives δy being determined so that, on integrating the partial derivatives δy, the error between steady state values for the engine performance variables y calculated by the non-linear engine performance model and steady state values for the engine performance variables y calculated from the integrated partial derivatives δy is reduced or eliminated; and
  (d) constructing a piecewise linearised engine performance model in which calculation of the engine performance variables y involves combining each of the engine control variables u and the engine state variables x with the respective partial derivative δy.

21 Claims, 10 Drawing Sheets

U.S. PATENT DOCUMENTS

| | | | |
|---|---|---|---|
| 2005/0193739 A1* | 9/2005 | Brunell et al. | 60/772 |
| 2006/0047487 A1* | 3/2006 | Volponi et al. | 703/9 |
| 2006/0282177 A1* | 12/2006 | Fuller et al. | 700/28 |
| 2007/0059838 A1* | 3/2007 | Morrison et al. | 436/55 |
| 2007/0061629 A1 | 3/2007 | Thums et al. | |
| 2007/0073525 A1 | 3/2007 | Healy et al. | |
| 2007/0083851 A1 | 4/2007 | Huang et al. | |
| 2007/0100471 A1 | 5/2007 | Kumar et al. | |
| 2007/0168174 A1* | 7/2007 | Davari et al. | 703/18 |
| 2008/0071395 A1* | 3/2008 | Pachner | 700/34 |
| 2008/0097662 A1* | 4/2008 | Volponi | 701/29 |
| 2008/0120074 A1* | 5/2008 | Volponi | 703/7 |
| 2008/0177505 A1* | 7/2008 | Volponi | 702/185 |
| 2008/0178600 A1* | 7/2008 | Healy et al. | 60/773 |
| 2008/0243310 A1* | 10/2008 | Esposito et al. | 700/268 |
| 2008/0270003 A1* | 10/2008 | Sims et al. | 701/100 |

OTHER PUBLICATIONS

Sastry et al., "Adaptive control of linearizable systems", IEEE, 1989.*

Endurthi, "Linearization and Health Estimation of a Turbofan Engine," MSc Thesis, Cleveland State University, Dec. 2004.

Henrion et al., "Linearization and Identification of Aircraft Turbofan Engine Models," IFAC Symposium on Automatic Control in Aerospace held in St. Petersburg, Russia from Jun. 14-18, 2004.

Reberga et al., "LPV Modeling of a Turbofan Engine," IFAC World Congress on Automatic Control held in Prague, Czech Republic from Jul. 4-8, 2005.

Leibov, "Aircraft Turbofan Engine Linear Model with Uncertain Eigenvalues," IEEE Transactions on Automatic Control, vol. 47, No. 8, Aug. 2002, pp. 1367-1369.

* cited by examiner

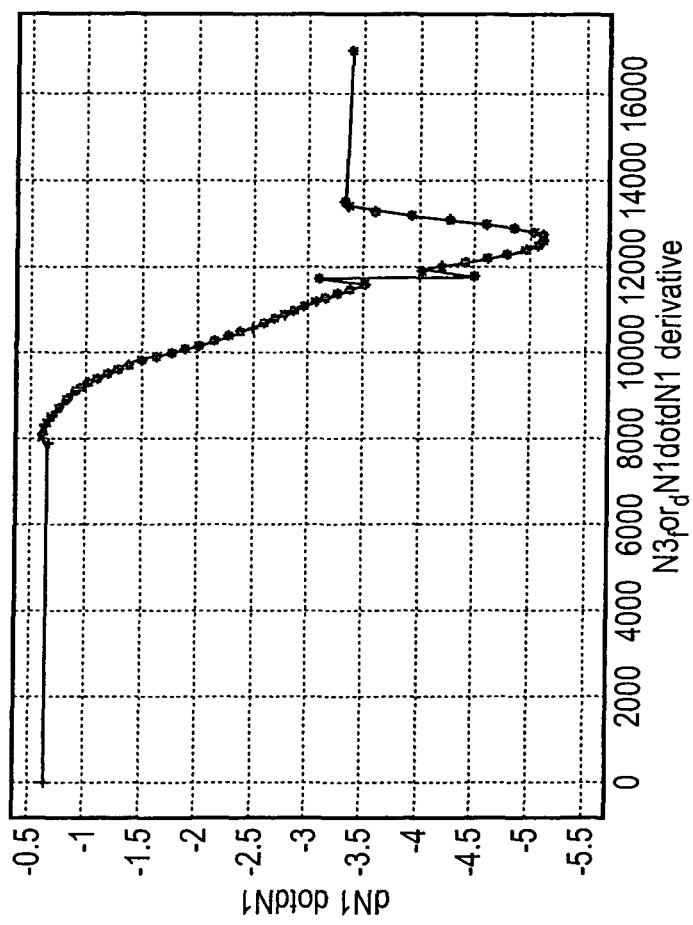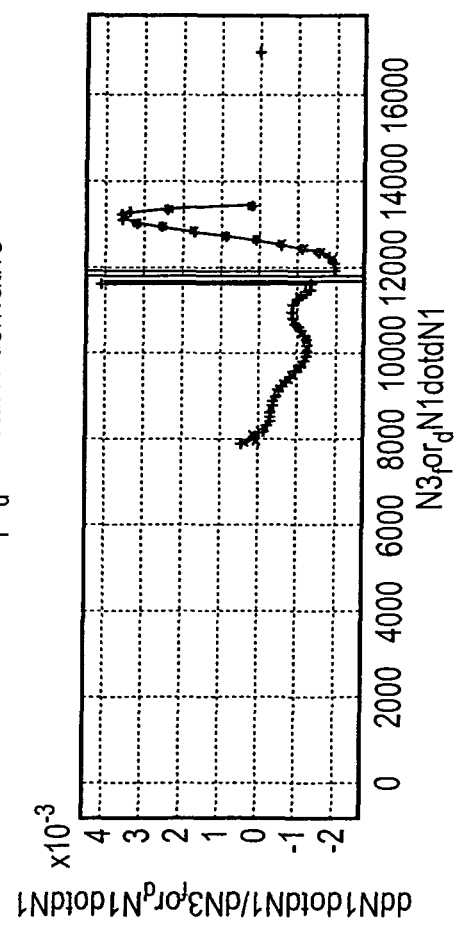
FIG. 7A
FIG. 7B

ENGINE PERFORMANCE MODEL

FIELD OF THE INVENTION

The present invention relates to engine performance models.

BACKGROUND OF THE INVENTION

Modern gas turbine engines, such as high bypass ratio civil aeroengines, are highly complex machines. Because of the need for realistic development times and the need to reduce costs, components and systems of a new engine have to be developed simultaneously and often without access to an actual prototype engine.

Engine performance models such as thermodynamic simulators are thus of crucial importance for engine development. Typically, they are functional models of the engine in which a plurality of linked modules or "bricks" model different components of the engine. The bricks have inputs and outputs connecting them to other bricks and each brick can be a complex model of the respective component in its own right. Such performance models are, therefore, highly non-linear and can require large numbers of iterative calculations in order to arrive at a solution for a given operating condition. Even with present day computing resources, such models are often not practically useable on the occasions when it is necessary to explore or obtain results for a range of operating conditions.

In view of the long solution times of non-linear engine performance models, it is desirable, therefore, to replace such models with faster models. One approach is to simulate the non-linear model with a piecewise linear engine performance model.

For example, Henrion, Reberga, Bernussou and Vary, *Linearisation and Identification of Aircraft Turbofan Engine Models*, IFAC Symposium on Automatic Control in Aerospace, Jun. 14-18, 2004, St Petersburg, Russia, discloses a piecewise linear engine performance model which simulates a highly nonlinear model of a high by-pass two-shaft gas turbine civil aircraft engine. The piecewise linear model was based on the state space representation:

$$\dot{x} = Ax + Bu \text{ and}$$

$$y = Cx + Du,$$

where u, x and y are vectors respectively corresponding to engine control variables u (e.g. fuel flow and inlet guide vane position), engine state variables x (e.g. rotor speeds and metal temperatures) and the engine performance variables y (e.g. gas pressures and temperatures), $\dot{x}$ is a vector corresponding to the time derivatives of the engine state variables x, and A, B, C and D are matrices of partial derivatives of the variables.

SUMMARY OF THE INVENTION

An aim of the present invention is improve the accuracy of piecewise linear engine performance models.

Thus a first aspect of the invention provides a method of constructing a piecewise linear engine performance model, comprising the steps of:
(a) providing a non-linear engine performance model which iteratively calculates engine performance variables y from a plurality of sub-models, each sub-model representing the performance of a component of the engine;
(b) defining a plurality of engine power conditions, each engine power condition being defined by one or more engine state variables x;
(c) for each of the engine power conditions, using the non-linear engine performance model to determine partial derivatives δy of the engine performance variables y with respect to engine control variables u and with respect to the engine state variables x, the values of the partial derivatives δy being determined so that, on integrating the partial derivatives δy, the error between steady state values for the engine performance variables y calculated δy the non-linear engine performance model and steady state values for the engine performance variables y calculated from the integrated partial derivatives δy is reduced or eliminated; and
(d) constructing a piecewise linearised engine performance model in which calculation of the engine performance variables y involves combining each of the engine control variables u and the engine state variables x with the respective partial derivative δy.

By "steady state", we mean a condition at which the time derivatives of the engine state variables x are zero. Thus "steady state values" of variables are the values adopted by the variables at such a condition.

By having the values of the partial derivatives δy determined so that, on integrating the partial derivatives δy, the error between the steady state values for the engine performance variables y is reduced or eliminated, the piecewise linearised model can calculate steady state values of the engine performance variables y with high fidelity.

Step (c) typically involves integrating one or more of the partial derivatives δy in order to determine the values of the partial derivatives δy that reduce or eliminate the error between the steady state values for the engine performance variables y calculated y the two models.

The method may include the further step of storing, displaying or conveying the piecewise linearised engine performance model constructed in step (d).

In some embodiments of the method there may be three or more partial derivatives δy for each engine performance variable y, and, in step (c), the partial derivatives δy may be determined for each engine performance variable y by the sub-steps of:
(i) calculating values for the partial derivatives δy from the non-linear engine performance model, the model being at steady state;
(ii) integrating the partial derivatives δy;
(iii) calculating a steady state value for the corresponding engine performance variable y from the non-linear engine performance model;
(iv) calculating the difference between one of the integrated partial derivatives δy and the calculated steady state value for the corresponding engine performance variable y; and
(v) adjusting the values of the other of the integrated partial derivatives δy so that the sum of the adjusted values equals said difference. For example, the magnitudes of the respective adjustments can be weighted according to the values of the integrated partial derivatives δy.

The method may further comprise, between steps (c) and (d), the step (c-ii) of:
for each of the engine power conditions, using the non-linear engine performance model to determine partial derivatives δx of the engine state variables x with respect to the engine control variables u, the values of the partial derivatives δx being determined so that, on integrating the partial derivatives δx, the error between steady state values for the engine state variables x calculated δy the non-linear engine performance model and steady state values for the engine state variables x calculated from the integrated partial derivatives δx is reduced or eliminated; and wherein, in step (d), the piecewise linearised engine performance model is constructed such that calculation of the engine state variables x involves combining each of the engine control variables u with the respective partial derivative δx.

By having the values of the partial derivatives δx determined so that, on integrating the partial derivatives δx, the error between the steady state values for the engine performance variables x is reduced or eliminated, the piecewise linearised model can calculate steady state values of the engine state variables x with high fidelity, which in turn improves the fidelity of the steady state values of the engine performance variables y calculated by the model.

Step (c-ii) typically involves integrating one or more of the partial derivatives δx in order to determine the values of the partial derivatives δx that reduce or eliminate the error between the steady state values for the engine state variables x calculated δy the two models.

In some embodiments of the method there are two partial derivatives δx for each engine state variable x, and, in step (c-ii), the partial derivatives δx may be determined for each engine state variable x by the sub-steps of:
  (i) calculating a value of a first of the partial derivatives δx from the non-linear engine performance model, the model being at steady state;
  (ii) integrating the first partial derivative δx;
  (iii) calculating a steady state value for the corresponding engine state variable x from the non-linear engine performance model;
  (iv) calculating the difference between the integrated first partial derivative δx and the calculated steady state value for the corresponding engine state variable x; and
  (v) setting the value of the second partial derivative δx so that the integrated second partial derivative δx is equal to said difference.

In other embodiments of the method there are three or more partial derivatives δx for each engine state variable x, and, in step (c-ii), the partial derivatives δx may be determined for each engine state variable x by the sub-steps of:
  (i) calculating values for the partial derivatives δx from the non-linear engine performance model, the model being at steady state;
  (ii) integrating the partial derivatives δx;
  (iii) calculating a steady state value for the corresponding engine state variable x from the non-linear engine performance model;
  (iv) calculating the difference between one of the integrated partial derivatives δx and the calculated steady state value for the corresponding engine state variable x; and
  (v) adjusting the values of the other of the integrated partial derivatives δx so that the sum of the adjusted values equals said difference. For example, the magnitudes of the respective adjustments can be weighted according to the values of the integrated partial derivatives δx.

Preferably, in step (b), the engine power conditions define one or more power curves.

The non-linear engine performance model can be represented by the state space equations:

$$\dot{x}=f(x,u,t) \text{ and}$$

$$y=h(x,u,t),$$

f and h being non-linear functions, t being time, u, x and y being vectors respectively corresponding to the engine control variables u, the engine state variables x and the engine performance variables y, and $\dot{x}$ being a vector corresponding to the time derivatives of the engine state variables x.

Consistent with this representation, the piecewise linearised engine performance model may be represented δy the expressions:

$$\dot{x}/A=x-Gu \text{ and}$$

$$y=Cx+Du,$$

A, G, C and D being matrices of partial derivatives.

Thus the partial derivatives δy of the engine performance variables y with respect to the engine control variables u may be components of matrix D, and the partial derivatives δy of the engine performance variables y with respect to the engine state variables x may be components of matrix C. The partial derivatives δx of the engine state variables x with respect to the engine control variables u may be components of matrix G. Partial derivatives of the time derivatives of the engine state variables x with respect to the engine state variables x may be components of matrix A.

In contrast to the A, B, C, D model of Henrion et al. (ibid.), adopting a model architecture in which the steady state and transient characteristics are partitioned between different matrices (G, C and D for steady state, and A for transients) simplifies the "steady state tuning" of step (c) (and optional step (c-ii)) of the method.

Preferably, the engine is a gas turbine engine. The engine state variables x may include one or more engine shaft speeds. The engine control variables u may include either or both of the combustor inlet fuel flow rate, and an engine inlet variable stator vane angle. The engine performance variables y may include any one or more of an engine compressor delivery pressure, an engine turbine exhaust gas temperature, and an engine pressure ratio. Where the engine power conditions define one or more power curves, the or each power curve may have a respective Mach number.

Second and third aspects of the invention respectively provide (A) a computer system arranged to construct a piecewise linear engine performance model, and (B) a computer program product carrying a computer program for constructing a piecewise linear engine performance model, each by performing the steps of:
  (a) interfacing to a non-linear engine performance model which iteratively calculates engine performance variables y from a plurality of sub-models, each sub-model representing the performance of a component of the engine;
  (b) receiving a plurality of engine power conditions, each engine power condition being defined by one or more engine state variables x;
  (c) for each of the engine power conditions, using the non-linear engine performance model to determine partial derivatives δy of the engine performance variables y with respect to engine control variables u and with respect to the engine state variables x, the values of the partial derivatives δy being determined so that, on integrating the partial derivatives δy, the error between steady state values for the engine performance variables y calculated by the non-linear engine performance model and steady state values for the engine performance variables y calculated from the integrated partial derivatives δy is reduced or eliminated; and
  (d) constructing a piecewise linearised engine performance model in which calculation of the engine performance variables y involves combining each of the engine control variables u and the engine state variables x with the respective partial derivative δy.

Thus the computer system and computer program product of the second and third aspects correspond to the method of first aspect. Consequently, optional features of the method of the first aspect may be applied separately or in any combination to the computer system of the second aspect and/or the computer program product of the third aspect.

A fourth aspect of the invention provides a piecewise linear engine performance model constructed according to the first aspect. Preferably, at steady state and where the engine power conditions define one or more power curves, the piecewise linear engine performance model and the non-linear engine performance model provide substantially identical calculations for the engine performance variables y along the or each power curve from 10% to 100% speed, and preferably from 0% to 100% speed.

Fifth, sixth and seventh aspects of the invention respectively provide the use of the piecewise linear engine performance model of the fourth aspect for (A) developing an electronic engine control system, (B) constructing a flight simulator, and (C) diagnosing engine events.

Eighth and ninth aspects of the invention respectively provide a computer program product carrying the piecewise linear engine performance model of the fourth aspect, and a computer system programmed to run the piecewise linear engine performance model of the fourth aspect.

A tenth aspect of the invention provides a method of constructing a piecewise linear engine performance model, comprising the steps of:
(a) providing a non-linear engine performance model which iteratively calculates engine performance variables y from one or more engine state variables x and one or more engine control variables u;
(b) defining a plurality of engine power conditions, each engine power condition being defined by at least one of the engine state variables x;
(c) representing the non-linear engine performance model by the state space equations:

$\dot{x}=f(x,u,t)$ and $y=h(x,u,t)$, f and h being non-linear functions, t being time, u, x and y being vectors respectively corresponding to the engine control variables u, the engine state variables x and the engine performance variables y, and $\dot{x}$ being a vector corresponding to the time derivatives of the engine state variables x, and, for each of the engine power conditions, using the non-linear engine performance model to determine respective partial derivatives for one or more of the engine state variables x, the engine performance variables y, and the time derivatives of the engine state variables x;
(d) performing, for at least one of the partial derivatives determined at step (c), the sub-steps of:
(i) displaying, in a first plot, values for the partial derivative against engine power condition;
(ii) displaying (preferably adjacent the first plot) a second plot of the gradient of the first plot against engine power condition; and
(iii) using the first and second plots to adjust one or more of the values for the partial derivative, delete one or more of the values for the partial derivative, and/or add one or more values for the partial derivative δy at further engine power conditions; and (e) constructing a piecewise linearised engine performance model in which calculation of the engine performance variables y involves combining the engine control variables u and the engine state variables x with the respective partial derivatives.

By displaying the second (gradient) plot as well as the first plot, it is much easier to confirm that adjust, deletion or addition of a particular partial derivative value has produced e.g. a smooth variation of the partial derivative with engine power condition.

The method may include the further step of storing, displaying or conveying the piecewise linearised engine performance model constructed in step (e).

For example, in some embodiments, steps (a) to (e) involve:
(a) providing a non-linear engine performance model which iteratively calculates engine performance variables y from a plurality of sub-models, each sub-model representing the performance of a component of the engine;
(b) defining a plurality of engine power conditions, each engine power condition being defined by one or more engine state variables x;
(c) for each of the engine power conditions, using the non-linear engine performance model to determine partial derivatives δy of the engine performance variables y with respect to engine control variables u and with respect to the engine state variables x;
(d) performing, for at least one of the partial derivatives δy, the sub-steps of:
(i) displaying, in a first plot, values for the partial derivative δy against engine power condition;
(ii) displaying (preferably adjacent the first plot) a second plot of the gradient of the first plot against engine power condition; and
(iii) using the first and second plots to adjust one or more of the values for the partial derivative δy, delete one or more of the values for the partial derivative δy, and/or add one or more values for the partial derivative δy at further engine power conditions; and
(e) constructing a piecewise linearised engine performance model in which calculation of the engine performance variables y involves combining each of the engine control variables u and the engine state variables x with the respective partial derivative δy.

In such embodiments, the method may further comprise, between steps (c) and (d), the step (c-ii) of:
for each of the engine power conditions, using the non-linear engine performance model to determine partial derivatives δx of the engine state variables x with respect to the engine control variables u; and
between steps (c-ii) and (e), the step (d-ii) of performing, for at least one of the partial derivatives δx, the sub-steps of:
(i) displaying, in a third plot, values for the partial derivative δx against engine power condition;
(ii) displaying (preferably adjacent the third plot) a fourth plot of the gradient of the first plot against engine power condition; and
(iii) using the third and fourth plots to adjust one or more of the values for the partial derivative δx, delete one or more of the values for the partial derivative δx, and/or add one or more values for the partial derivative δx at further engine power conditions;
wherein, in step (e), the piecewise linearised engine performance model is constructed such that calculation of the engine state variables x involves combining each of the engine control variables u with the respective partial derivative δx.

The method of the tenth aspect may be combined with the method of the first aspect. For example, steps (a) to (c) and (e) and optional step (c-ii) of such embodiments of the method of the tenth aspect may be respectively replaced by steps (a) to (d) and optional step (c-ii) of the method of first aspect, and step (d) of such embodiments of the method of the tenth aspect may be performed after step (c) (and optionally after step (c-ii)) but before step (d) of the method of first aspect.

Eleventh and twelfth aspects of the invention, corresponding to the method of the tenth aspect, respectively provide (A) a computer system arranged to construct a piecewise linear engine performance model, and (B) a computer program product carrying a computer program for constructing a piecewise linear engine performance model, each by performing the steps of:

(a) interfacing to a non-linear engine performance model which iteratively calculates engine performance variables y from one or more engine state variables x and one or more engine control variables u;

(b) receiving a plurality of engine power conditions, each engine power condition being defined by at least one of the engine state variables x;

(c) representing the non-linear engine performance model by the state space equations:

$\dot{x}=f(x,u,t)$ and $y=h(x,u,t)$, f and h being non-linear functions, t being time, u, x and y being vectors respectively corresponding to the engine control variables u, the engine state variables x and the engine performance variables y, and $\dot{x}$ being a vector corresponding to the time derivatives of the engine state variables x, and, for each of the engine power conditions, using the non-linear engine performance model to determine respective partial derivatives for one or more of the engine state variables x, the engine performance variables y, and the time derivatives of the engine state variables x;

(d) performing, for at least one of the partial derivatives determined at step (c), the sub-steps of:

(i) displaying, in a first plot, values for the partial derivative against engine power condition;

(ii) displaying a second plot of the gradient of the first plot against engine power condition; and (iii) using the first and second plots to adjust one or more of the values for the partial derivative, delete one or more of the values for the partial derivative, and/or add one or more values for the partial derivative at further engine power conditions; and (e) constructing a piecewise linearised engine performance model in which calculation of the engine performance variables y involves combining the engine control variables u and the engine state variables x with the respective partial derivative.

Optional features of the method of the tenth aspect may be applied separately or in any combination to the computer system of the eleventh aspect and/or the computer program product of the twelfth aspect. Further, the computer system of the tenth aspect may also be the computer system of the second aspect, and the computer program product of the twelfth aspect may be the computer program product of the third aspect.

A typical computer system of the present invention includes a central processing unit (CPU), input means, output means and data storage means (such as RAM). A display, such as a monitor, may be provided for display purposes.

For example, a computer system according to the invention may include a processor adapted to determine partial derivatives and to construct a piecewise linearised engine performance model.

The term "computer program product" includes any computer readable medium or media which can be read and accessed directly by a computer. Typical media include, but are not limited to: magnetic storage media such as floppy discs, hard disc storage medium and magnetic tape; optical storage media such as optical discs or CD-ROM; electrical storage media such as RAM and ROM; and hybrids of these categories such as magnetic/optical storage media.

BRIEF DESCRIPTION OF THE DRAWINGS

Embodiments of the invention will now be described by way of example with reference to the accompanying drawings in which:

FIGS. 7a and b show plots from a data editor of (a) the partial derivative ∂N1dot/∂N1 against engine power condition, N3, and (b) the gradient of the plot (a) against engine power condition, N3;

DETAILED DESCRIPTION

Non-Linear Engine Performance Model

Figure 1:
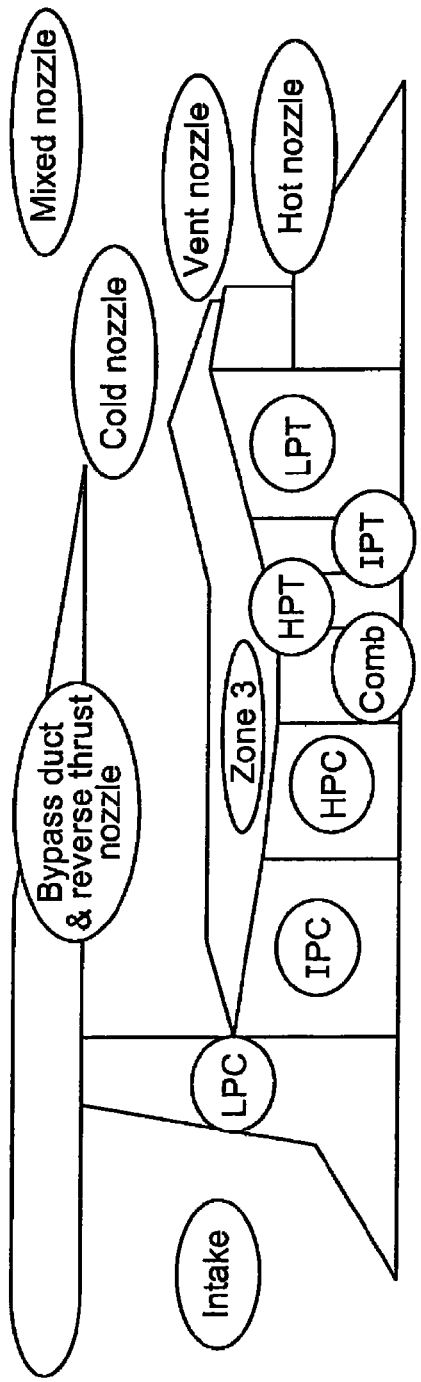
FIG. 1 shows a schematic diagram of the structure for a Rolls-Royce thermodynamic engine simulator.
Figure 2:
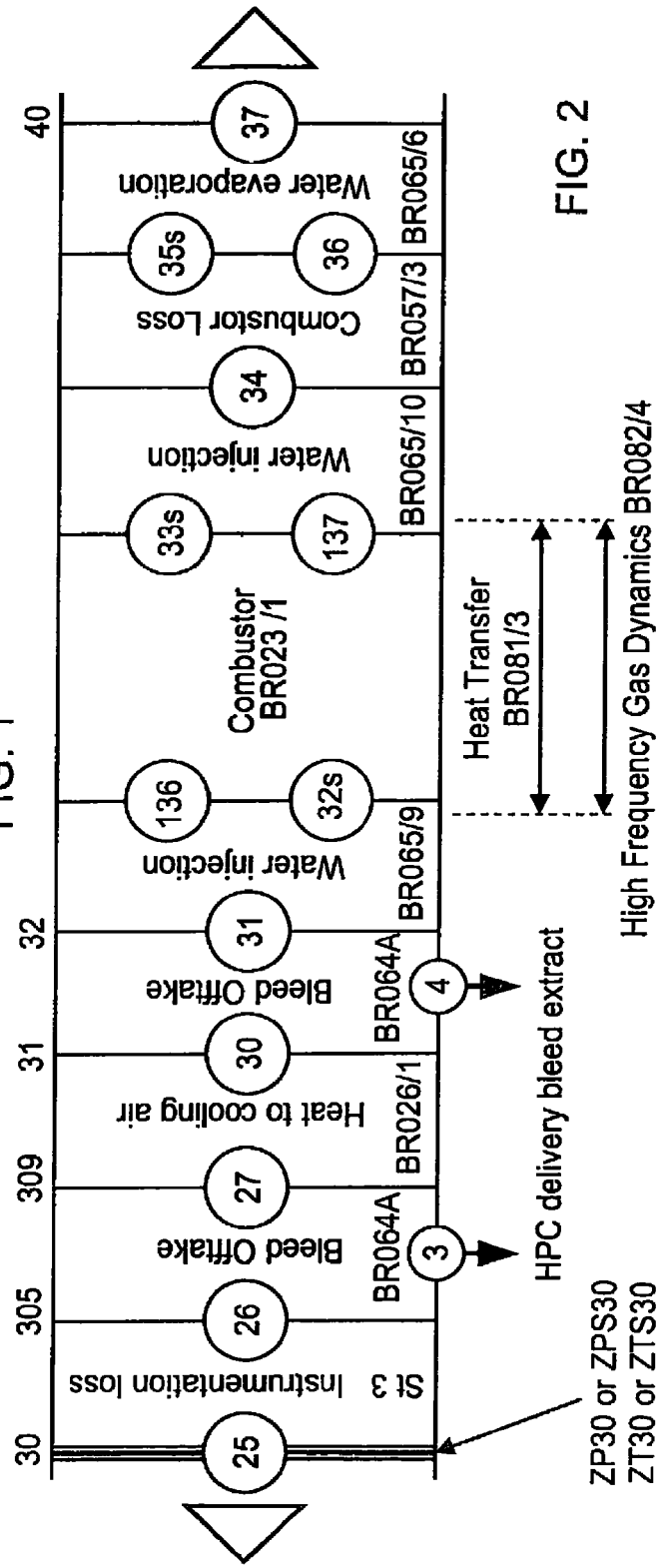
FIG. 2 shows detail of the combustor brick for the simulator of FIG. 1.

FIG. 1 shows a schematic diagram of the structure for a Rolls-Royce thermodynamic engine simulator. Each brick of the simulator is represented by a respective circled descriptor. FIG. 2 shows detail of the combustor (Comb) brick for the simulator of FIG. 1. The numbered features in FIG. 2 are calculation planes through the engine model where the working gas path fluid properties are calculated. Model bricks transfer the fluid properties from one plane to the next using non-linear thermodynamics.

The thermodynamic engine simulator shown schematically in FIG. 1 is an aero-thermal engine performance program capable of modelling steady state and transient operations throughout the flight envelope of an engine between engine idle speed and design speed.

However, the simulator is complex and highly non-linear, a typical solution time for one operating condition being at least about 25 ms.

Piecewise Linearised Model Representation

Thus to provide an alternative model capable of faster solution times, a set of linearised models for the simulator are derived, the linearised models combining to provide a piecewise linear engine performance model.

Figure 3:
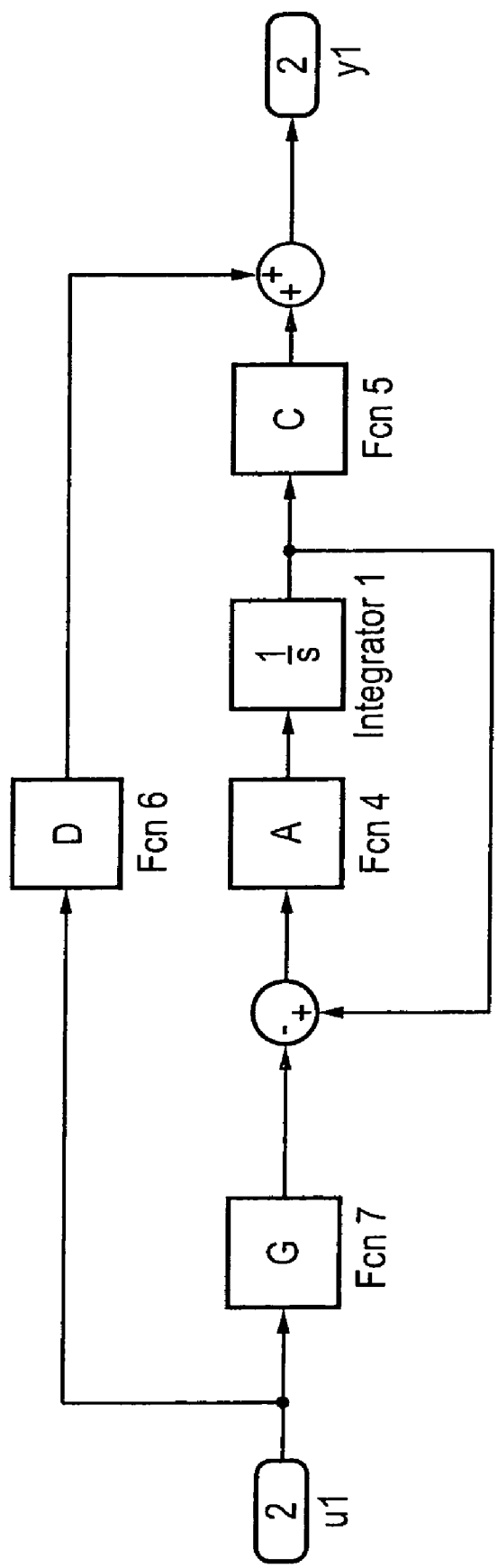
FIG. 3 is a graphic of a state space representation.

The linearised models are based on the state space representation:

$$\dot{x}/A = x - Gu \text{ and}$$

$$y = Cx + Du,$$

where u, x and y are vectors respectively corresponding to engine control variables u, engine state variables x and the engine performance variables y, $\dot{x}$ is a vector corresponding to the time derivatives of the engine state variables x, and A, G, C and D are matrices of partial derivatives. FIG. 3 is a graphical representation of the state space.

Table 1 lists typical u, x and y variables for a Rolls-Royce Trent 900 engine.

TABLE 1

| Control variables u | State variables x | Performance variables y |
|---|---|---|
| WF - fuel flow (pound per hour) | N1 - Fan speed (rpm) | P30 - HP compressor delivery pressure (psia) |
| VSV - Variable Stator Vane (angle in degrees) | N2 - IP compressor speed (rpm) | T44 - Exhaust gas turbine temperature (Kelvin) |
| IP8 - IP compressor handling bleed valve position (on or off) | N3 - HP compressor speed (rpm) | EPR - Engine Pressure Ratio |
| HP3 - HP compressor handling bleed valve position (on or off) | | |
| HP6 - Aircraft cabin bleed demand (on or off) | | |

The definitions of the A, G, C and D matrices are then as follows:

| "A" = | $\partial N1dot/\partial N1$ | | $\partial N1dot/\partial N2$ | | $\partial N1dot/\partial N3$ | |
|---|---|---|---|---|---|---|
| | $\partial N2dot/\partial N1$ | | $\partial N2dot/\partial N2$ | | $\partial N2dot/\partial N3$ | |
| | $\partial N3dot/\partial N1$ | | $\partial N3dot/\partial N2$ | | $\partial N3dot/\partial N3$ | |
| "G" = | $\partial N1/\partial WF$ | $\partial N1/\partial VSV$ | $\partial N1/\partial IP8$ | $\partial N1/\partial HP3$ | $\partial N1/\partial HP6$ | |
| | $\partial N2/\partial WF$ | $\partial N2/\partial VSV$ | $\partial N2/\partial IP8$ | $\partial N2/\partial HP3$ | $\partial N2/\partial HP6$ | |
| | $\partial N3/\partial WF$ | $\partial N3/\partial VSV$ | $\partial N3/\partial IP8$ | $\partial N3/\partial HP3$ | $\partial N3/\partial HP6$ | |
| "C" = | $\partial P30/\partial N1$ | $\partial P30/\partial N2$ | $\partial P30/\partial N3$ | | | |
| | $\partial T44/\partial N1$ | $\partial T44/\partial N2$ | $\partial T44/\partial N3$ | | | |
| | $\partial EPR/\partial N1$ | $\partial EPR/\partial N2$ | $\partial EPR/\partial N3$ | | | |
| "D" = | $\partial P30/\partial WF$ | $\partial P30/\partial VSV$ | $\partial P30/\partial IP8$ | $\partial P30/\partial HP3$ | $\partial P30/\partial HP6$ | |
| | $\partial T44/\partial WF$ | $\partial T44/\partial VSV$ | $\partial T44/\partial IP8$ | $\partial T44/\partial HP3$ | $\partial T44/\partial HP6$ | |
| | $\partial EPR/\partial WF$ | $\partial EPR/\partial VSV$ | $\partial EPR/\partial IP8$ | $\partial EPR/\partial HP3$ | $\partial EPR/\partial HP6$ | |

An advantage of using this state space representation, rather than the representation adopted by Henrion et al. (ibid) is that the G matrix term becomes a steady state gain from input to output. The dynamics of the model are then all handled by the A matrix which operates as a gain on changes to the shaft speeds, N1, N2 and N3. As explained below, this architecture facilitates steady state error minimisation. By substituting G=−B/A, the Henrion state space representation is retrieved.

Obtaining the Partial Derivatives

The partial derivatives are derived at a plurality of power conditions (typically defined by an N3 value) and a plurality of flight conditions (defined by the Mach number, Mn), the power conditions at a given Mach number defining an engine power curve.

The flight conditions do not require an altitude variable, as they can be referred back to sea level static (SLS) pressure by using empirical correction factors (explained below).

The partial derivatives for the A, G, C and D matrices are obtained for the respective power and flight condition by modelling the non-linear engine performance model as a linear system. There are number of tools and techniques known to the skilled person for performing such linearisation. For example, Matlab linearisation as used in Henrion et al. (ibid), perturbation linearisation, or steady state error reduction can be used. In general, these techniques involve running the non-linear model to find the steady state condition (i.e. the condition at which the time derivatives of the state variables are zero) for respective power and flight conditions, and then perturbing or adjusting the control and state variables in a systematic way at the steady state condition to provoke corresponding changes in the other variables. A more detailed explanation of such linearisation techniques can be found e.g. in Endurth, *Linearisation and Health Estimation of a Turbofan Engine*, thesis for Master of Science in Electrical Engineering, Cleveland State University, December 2004.

The perturbations at steady state provide the partial derivatives for the A, G, C and D matrices, noting that in order to provide the components of the A matrix, the non-linear model must be capable of determining the rate of change with time of the state variables on perturbation of those variables.

Steady State Tuning

An aim of steady state tuning is to set the values of the partial derivatives for the G, C and D matrices so that on integrating the partial derivatives, the error between steady state values for the performance variables y and state variables x calculated by the non-linear engine performance model, and values for y and x calculated from the integrated partial derivatives, is reduced or eliminated. In this way, any error in the piecewise linearised model representation can be focused in the dynamic part of the model represented by the A matrix. This is advantageous because the piecewise linearised model will often be used to analyse steady state conditions, and adopting a model architecture in which the steady state and transient characteristics are partitioned between different matrices (G, C and D for steady state, and A for transients) allows steady state conditions to be modelled with high fidelity.

The steady state tuning takes the form of error sharing. Taking the G matrix first, in the case where the bleeds IP8, HP3 and HP6 are all "off", the G matrix components are:

| ∂N1/∂WF | ∂N2/∂WF | ∂N3/∂WF |
| --- | --- | --- |
| ∂N1/∂VSV | ∂N2/∂VSV | ∂N3/∂VSV | and each of the ∂N, ∂N2 and ∂N3 terms can be tuned as follows (taking the N1 partials as the example). Firstly, the ∂N1/∂VSV values are obtained from the linearisation analysis for each power condition (i.e. N3) at different environmental conditions (Mn). The steady state solutions previously obtained from the non-linear engine performance model then allow the ∂N1/∂VSV values to be determined as a function of VSV, rather than N3, for each Mn. Each function of ∂N1/∂VSV against VSV for a respective Mn can be integrated to provide $\int(\partial N1/\partial VSV).dVSV$ as a function of VSV. This integral can then be re-expressed as a function of N3.

However, the steady state solutions obtained from the non-linear engine performance model already provide a plot of N1 against N3 for each Mn.

Thus the value for ∂N1/∂WF in the G matrix can be set to ensure that steady state N1=∂(∂N1/∂VSV).dVSV+∂(∂N1/∂WF).dWF. In other words, for each power condition/environmental condition combination ∂(∂N1/∂WF).dWF=steady state N1−∂(∂N1/∂VSV).dVSV.

Effectively, therefore, it is not necessary to determine the ∂N1/∂WF terms in the linearisation analysis because their values will be set by the steady state tuning.

The ∂N2/∂WF and ∂N3/∂WF terms can be tuned in a similar manner.

The bleed partials are taken as is from the linearisation analysis δy perturbing the bleed flow at the corresponding bleed port. The resulting partial derivative is not integrated but becomes a pure gain on the corresponding bleed flow in the piecewise linear model. Of course these bleed flow partials become a function of engine power (N3) and flight condition (Mach number) and are corrected for altitude condition (see below).

Figure 4:
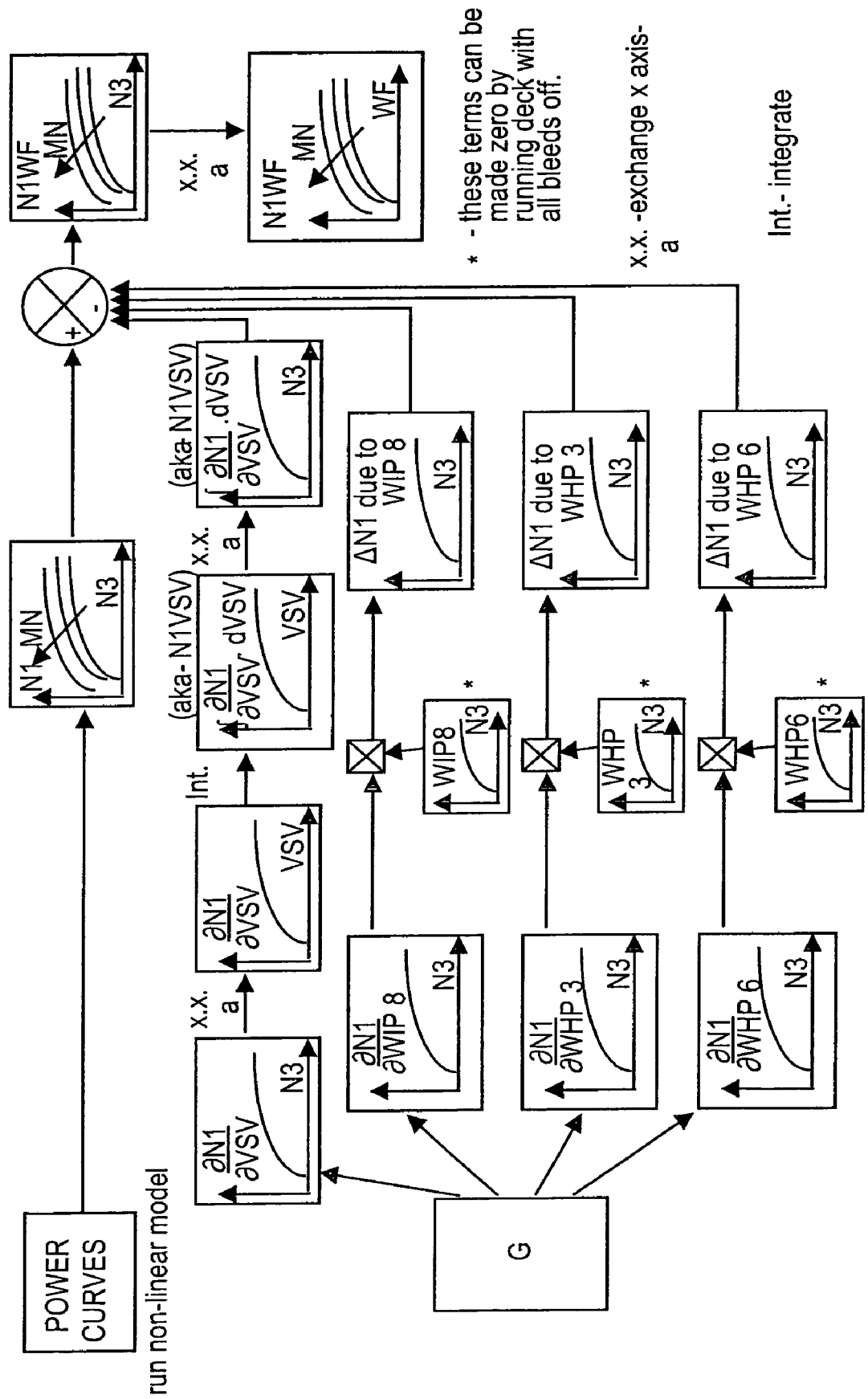
FIG. 4 shows graphically a procedure for tuning partial derivatives for the G matrix of FIG. 3.

FIG. 4 shows graphically the procedure for tuning the partial derivatives for the G matrix.

For the C and D matrices, a slightly different approach is preferred. Taking the P30 partials of these two matrices as the example (and assuming again that all the bleeds are "off"), firstly the ∂P30/∂VSV, ∂P30/∂WF, ∂P30/∂N1, ∂P30/∂N2 and ∂P30/∂N3 values are obtained form the linearisation analysis for each power condition (i.e. N3) at different environmental conditions (Mn). The steady state solutions previously obtained from the non-linear engine performance model allow the ∂P30/∂VSV, ∂P30/∂WF, ∂P30/∂N1 and ∂P30/∂N2 values to be respectively determined as functions of VSV, WF, N1 and N2 (i.e. their respective changing variables) rather than N3, for each Mn. The ∂P30/∂N3 values are already available as a function of their changing variable N3. Each function can then be integrated, and in the case of the integrals for ∂P30/∂VSV, ∂P30/∂WF, ∂P30/∂N1 and ∂P30/∂N2 re-expressed in relation to N3, to provide each of $\int(\partial P30/\partial VSV).dVSV$, $\int(\partial P30/\partial WF).dWF$, $\int(\partial P30/\partial N1).dN1$, $\int(\partial P30/\partial N2).dN2$ and $\int(\partial P30/\partial N3).dN3$ as a function of N3.

The steady state solutions obtained from the non-linear engine performance model already provide a plot of P30 against N3 for each Mn.

Now, for steady state tuning, the following condition should be met:

steady state $P30=\int(\partial P30/\partial VSV).dVSV+\int(\partial P30/\partial WF).dWF+\int(\partial P30/\partial N1).dN1+\int(\partial P30/\partial N2).dN2+\int(\partial P30/\partial N3).dN3$ and this is preferably achieved by determining the value for steady state P30−$\int(\partial P30/\partial VSV).dVSV$, and adjusting the values of $\int(\partial P30/\partial WF).dWF$, $\int(\partial P30/\partial N1).dN1$, $\int(\partial P30/\partial N2).dN2$ and $\int(\partial P30/\partial N3).dN3$, and hence the values of their corresponding partial derivatives, to meet the steady state tuning condition.

Conveniently, the adjustments are performed so that the magnitudes of the respective adjustments are weighted according to the values of the integrands.

Figure 5:
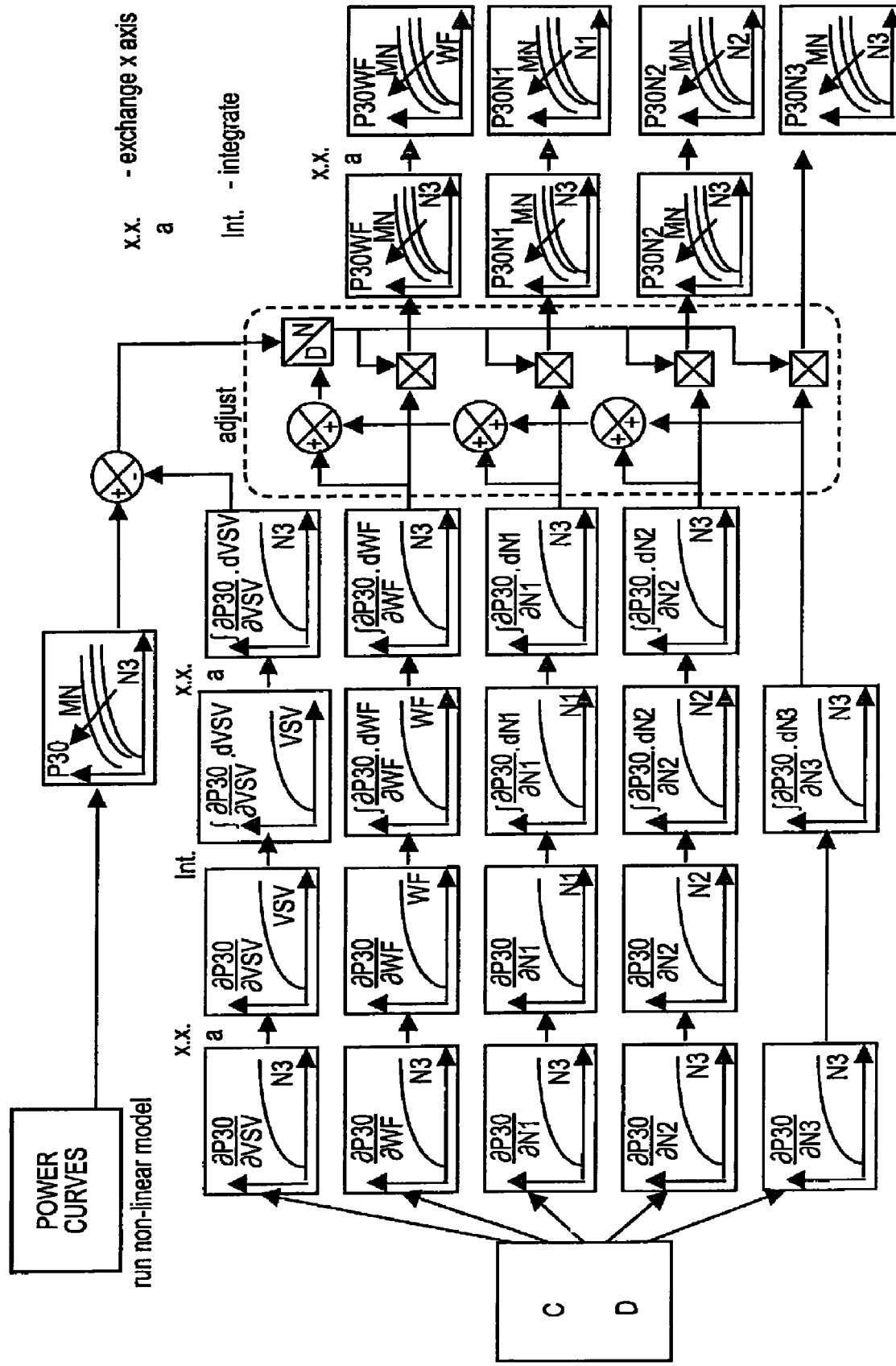
FIG. 5 shows graphically a procedure for tuning partial derivatives for the C and D matrices of FIG. 3.

FIG. 5 shows graphically the procedure for tuning the partial derivatives for the C and D matrices. Again, the bleed partials are not tuned, but taken as is from the linearisation analysis.

The examples above use approaches in which tuning is around VSV. However, the approaches could be changed to tune around another variable such as WF.

Altitude Correction

Preferably, the non-linear engine performance model is perturbed at the following ISA (International Standard Atmosphere) day environmental conditions:

| Altitude (ft) | 0 | 0 | 10k | 20k | 30k | 35k |
| --- | --- | --- | --- | --- | --- | --- |
| Mn | 0 | 0.2 | 0.4 | 0.6 | 0.8 | 0.95 | which are representative of a typical flight profile.

However, rather than having altitude as a separate environmental condition (like Mn), it is possible instead simply to adjust the total temperature at inlet, T20, and total pressure at inlet, P20, to the non-linear model to emulate changes in altitude away from SLS.

Conveniently, the ambient temperature, $T_{amb}$, and ambient pressure, $P_{amb}$, are defined in ISA day tables as a function of altitude. T20 and P20 can then be readily corrected for a particular altitude and temperature using the known expressions:

$T20=(T_{amb}+T_{delta})\cdot(1+0.2\,Mn^2)$, and $P20=P_{amb}\cdot(1+0.2\,Mn^2)^{3.5}$ where $T_{delta}$ is the departure from the ISA temperature at the given altitude.

By using correction factors internally to the piecewise linearised model, the relationships between the various variables remain more constant over a wider range of conditions.

Figure 6A:
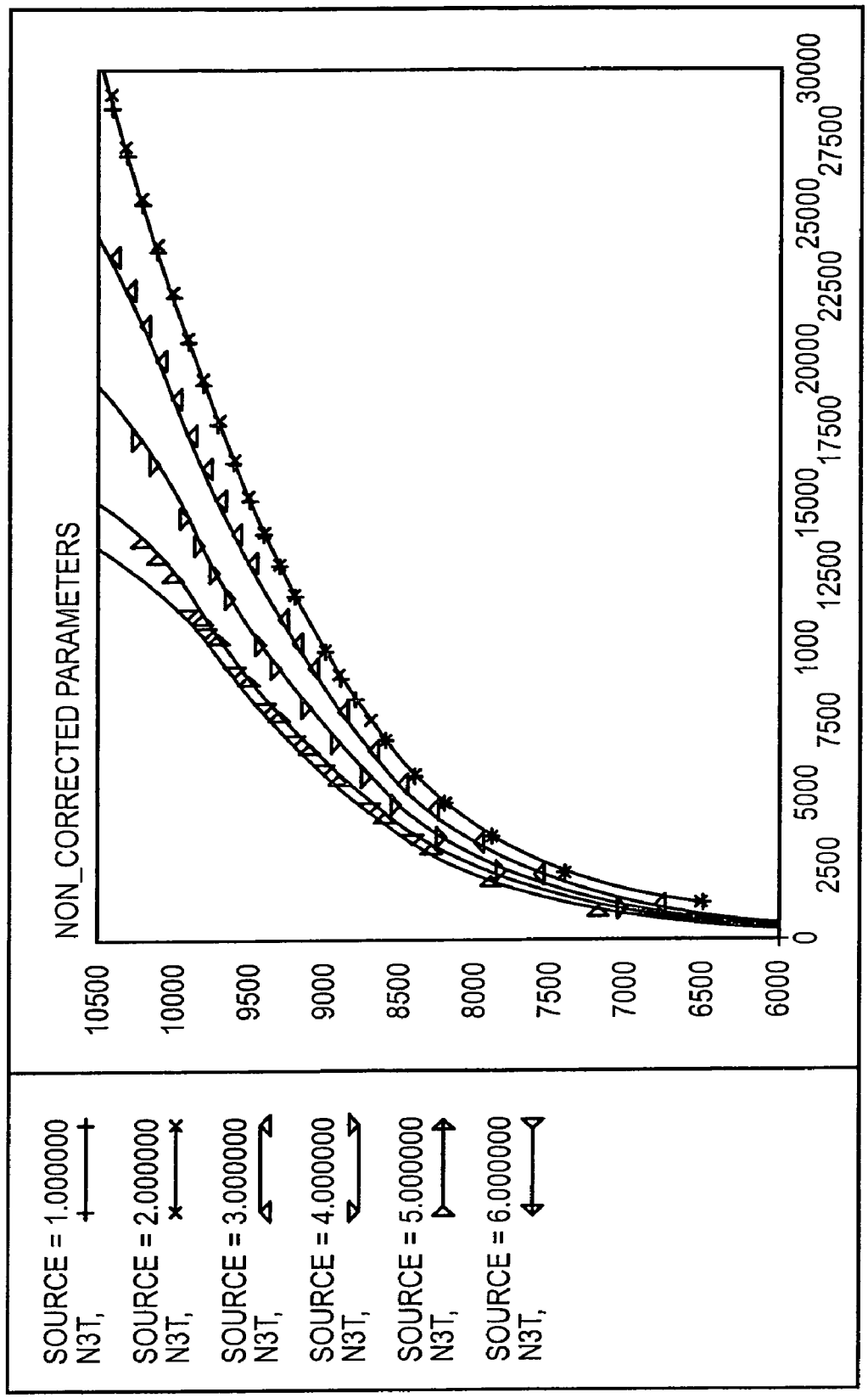
FIGS. 6a and b show plots from a linearised model for N3 against WF in (a) altitude-uncorrected and (b) altitude-corrected forms over a range of altitude conditions.
Figure 6B:
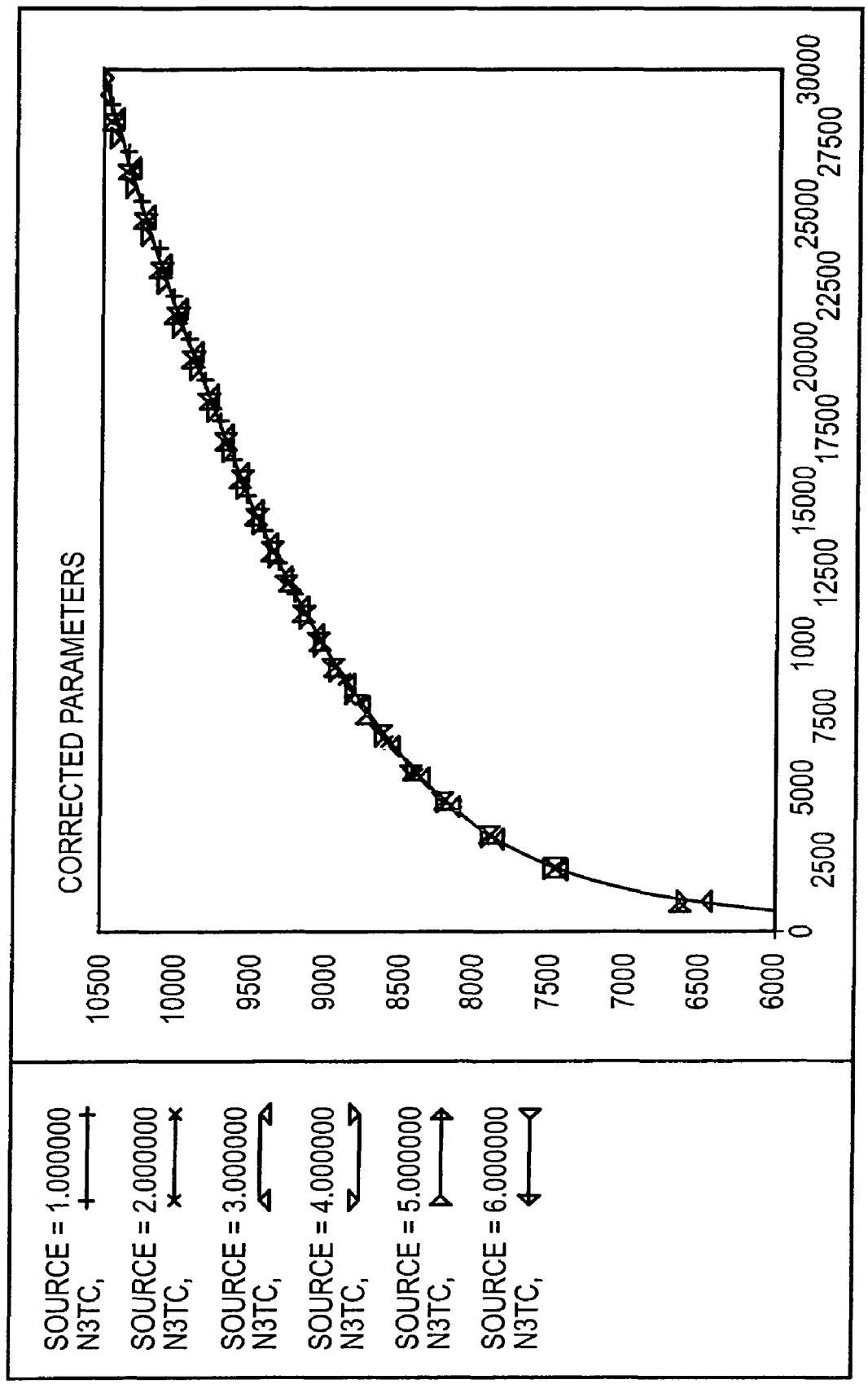

FIGS. 6a and b show plots from the linearised model for N3 against WF in (a) altitude-uncorrected and (b) altitude-corrected forms over a range of altitude conditions. It can be seen that the corrected form (FIG. 6b) shows practically no variation with altitude condition.

Editing the Data

The partial derivative data obtained from the linearisation and tuning, may have occasional outlier values, or may require extrapolation or smoothing. A data editor can be used to perform these tasks. Advantageously, such an editor has a simultaneous gradient display in which, in a first plot values for a particular partial derivative against engine power condition (e.g. N3) are displayed, and in a second plot (which is adjacent the first plot) the gradient of the first plot against engine power condition is displayed. FIGS. 7a and b show respective such plots for the A matrix partial ∂N1dot/∂N1. The partial varies smoothly with N3, except for two outliers, which are particularly evident in the gradient plot of FIG. 7b.

Figure 8A:
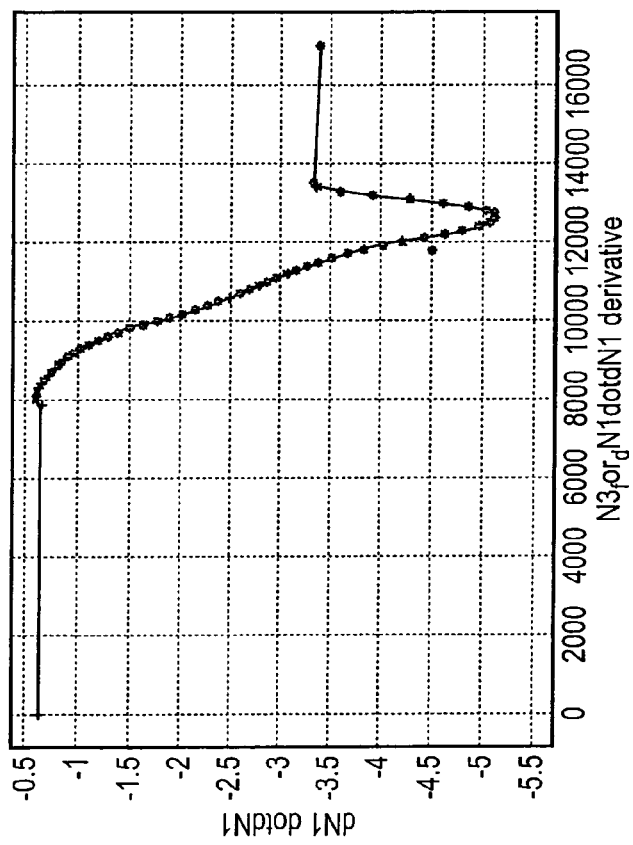
FIGS. 8a and b show the plots of FIGS. 7a and b after adjustment of the value of ∂N1dot/∂N1 for two outlier points.
Figure 8B:
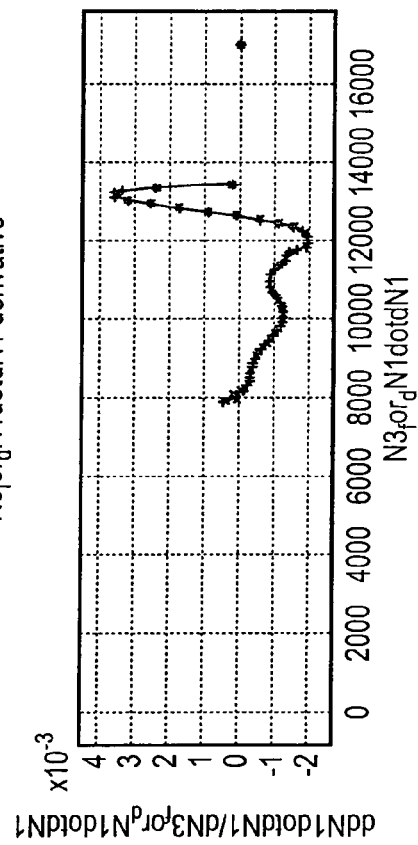

The data editor allows the values of the outliers to be adjusted by "dragging and dropping" their respective points on the plot of FIG. 7a. A smooth transition in the gradient plot allows the user to confirm that the points have been repositioned correctly. FIGS. 8a and b show the plots of FIGS. 7a and b after the outliers have been repositioned in this way.

The data editor also allows selected points to be deleted, or additional points to be added at further power conditions.

Model Implementation

To obtain values for the A, G, C, D matrix components away from the power and environmental conditions at which the linearisation analysis was performed, linear interpolation or extrapolation is used.

Typically, each partial derivative matrix component is a function of its respective changing variable (i.e. N2 in ∂T44/∂N2) and the Mn.

This dependency can be modelled in practice δy the use of e.g. 2-D Look-Up Table in Simulink™ from The MathWorks. 2-D Look-Up Table performs 2-D linear interpolation of input values using the specified table. Extrapolation is performed outside the table boundaries Comparison Between Models The piecewise linearised model contains first order transfer functions (i.e. the components of the A, G, C, D matrices), which are locally representative of highly non-linear engine dynamics. Because the transfer functions usually vary strongly within a 3D flight envelope (defined by N3, Mn and altitude), a significant number of linear models must generally be obtained. Nonetheless, the piecewise linearised model, once constructed, can converge significantly more quickly on a solution than the non-linear model which it emulates, a typical solution time for the piecewise linearised model being less than 5 ms (representing at least a factor of five increase in speed relative to the non-linear model). Further this speed does not have to come at the cost of significant errors.

Figure 9B:
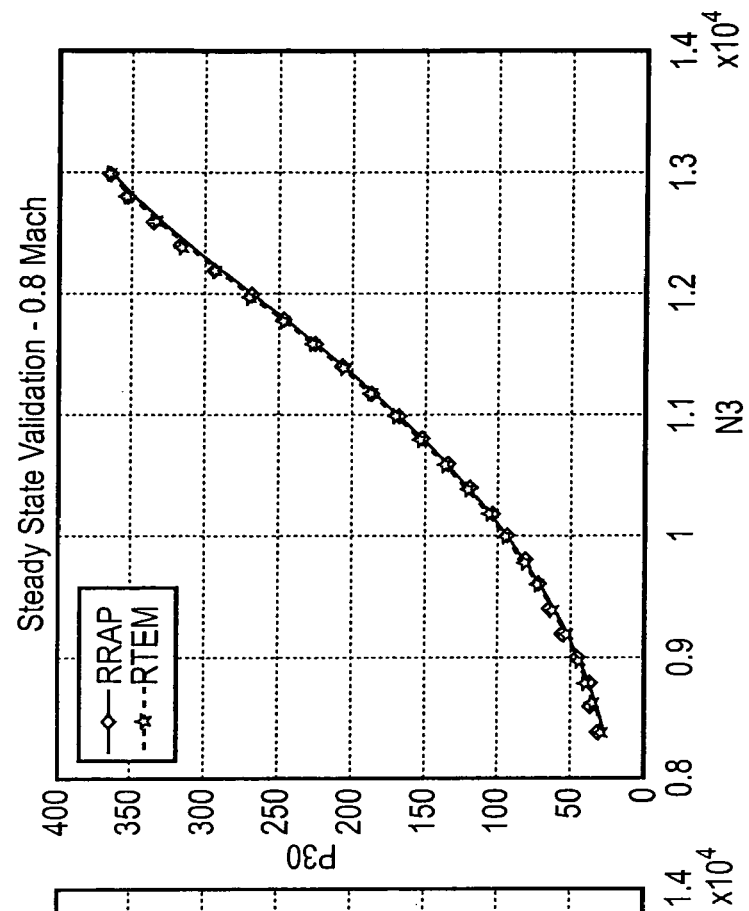
FIGS. 9a and b each show power curve plots of P30 against N3 at steady state obtained from the non-linear model (RRAP) and the piecewise linearised model (RTEM) (a) for an altitude of 0 ft and Mn=0, and (b) for an altitude of 30000 ft and Mn=0.8.
Figure 9A:
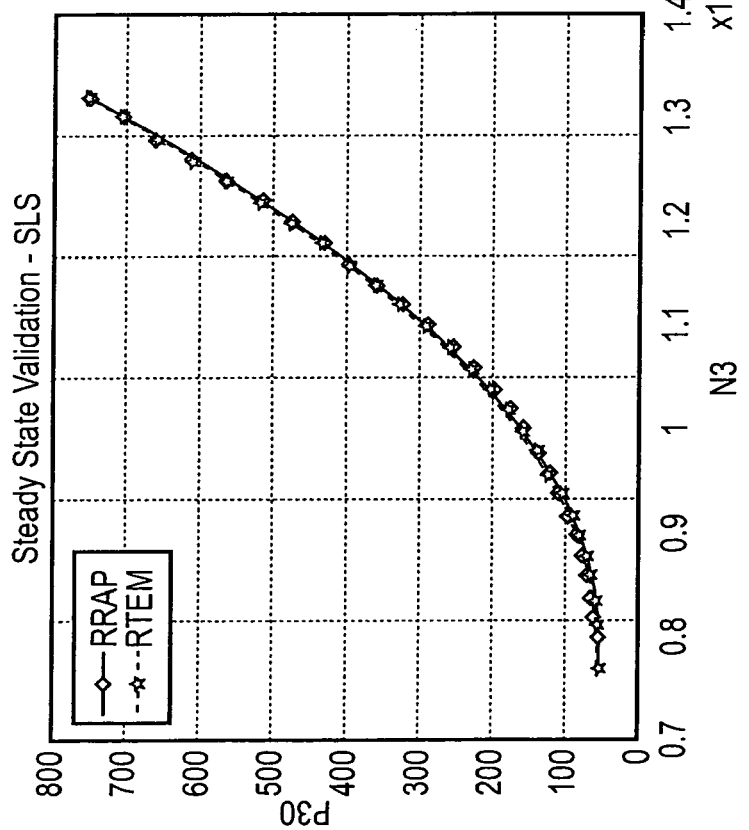

FIGS. 9a and b each show power curve plots of P30 against N3 at steady state obtained from the non-linear model (RRAP) and the piecewise linearised model (RTEM) (a) for an altitude of 0 ft and Mn=0, and (b) for an altitude of 30000 ft and Mn=0.8. The plots show that at steady state the models provide effectively identical calculations for P30 along the power curve (although near idle, i.e. at less than 10% N3, tuning can be very sensitive to small errors due to the relationship between N3 and WF). Similar correspondence between the models is also found for the other engine performance variables y. Overall, at steady state, there is little or no difference between the solutions from the two models, at least for interpolations within the ranges of the modelled environmental and power conditions, i.e. any difference between the models is substantially within the calculation precision of the computers used to run the models.

Figures 10A, 10B:
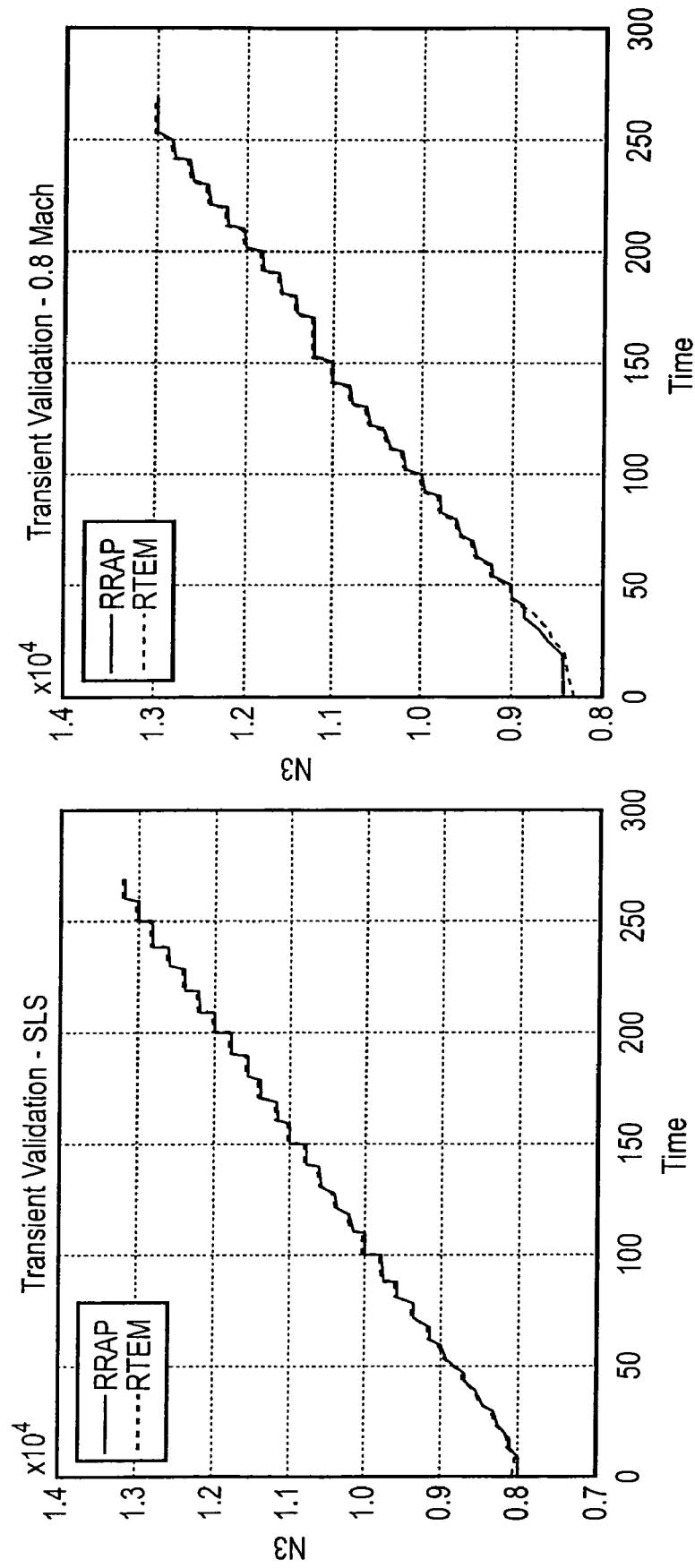
FIGS. 10a and b each show plots of transiently responding N3 against time obtained from the non-linear model (RRAP) and the piecewise linearised model (RTEM) (a) for an altitude of 0 ft and Mn=0, and (b) for an altitude of 30000 ft and Mn=0.8.

FIGS. 10a and b each show plots of transiently responding N3 against time obtained from the non-linear model (RRAP) and the piecewise linearised model (RTEM) (a) for an altitude of 0 ft and Mn=0, and (b) for an altitude of 30000 ft and Mn=0.8. Each transient was obtained by stepping WF the requisite amount at each increment and simultaneously scheduling the VSV to obtain 200 rpm N3 steps appropriately, all bleeds off. The match between the respective plots is less exact than at steady state, as should be expected since tuning was only performed at steady state. The plot for the non-linear model has slightly more pronounced "steps" at low N3, which distinguishes it from the plot for the piecewise linearised model. However, the match is still sufficiently good for the piecewise linearised model to be used in place of the non-linear model for analysing transient events.

Applications

There are a variety of applications for piecewise linearised models, such as the model described above. For example, they can be used:
  to construct flight simulators,
  in engine test/service facilities for engine event diagnostics, development testing or troubleshooting, and
  to assist in "wet" rig testing of fuel controllers.

In particular, simulation studies using such models are becoming increasingly important in the early design stages of electronic engine controls (EECs), e.g. in relation to full authority digital engine control (FADEC) design. Where the fidelity of the linearised model to the non-linear model, or actual engine, is good, control strategies can be tested out entirely in silico. Further, the linearised model may subsequently be used for validation of the EEC software (as evidence required for EEC certification). It may also be used for pass-off testing of EECs.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The references mentioned above are hereby incorporated by reference.

What is claimed is:

1. A method of constructing a piecewise linear engine performance model, comprising the steps of:
  (a) providing a non-linear engine performance model which iteratively calculates engine performance variables y from a plurality of sub-models, each sub-model representing the performance of a component of the engine;
  (b) defining a plurality of engine power conditions, each engine power condition being defined by one or more engine state variables x;
  (c) for each of the engine power conditions, using the non-linear engine performance model to determine, via a processor, partial derivatives δy of the engine performance variables y with respect to engine control variables u and with respect to the engine state variables x, the values of the partial derivatives δy being determined so that, on integrating the partial derivatives δy, the error between steady state values for the engine performance variables y calculated by the non-linear engine performance model and steady state values for the engine performance variables y calculated from the integrated partial derivatives δy is reduced or eliminated; and
  (d) constructing, via the processor, a piecewise linearised engine performance model in which calculation of the engine performance variables y involves combining each of the engine control variables u and the engine state variables x with the respective partial derivative δy.

2. The method of constructing a piecewise linear engine performance model according to claim 1, wherein there are three or more partial derivatives δy for each engine performance variable y, and, in step (c), the partial derivatives δy are determined for each engine performance variable y by the sub-steps of:
  (i) calculating values for the partial derivatives δy from the non-linear engine performance model, the model being at steady state;
  (ii) integrating the partial derivatives δy;

(iii) calculating a steady state value for the corresponding engine performance variable y from the non-linear engine performance model;
(iv) calculating the difference between one of the integrated partial derivatives δy and the calculated steady state value for the corresponding engine performance variable y; and
(v) adjusting the values of the other of the integrated partial derivatives δy so that the sum of the adjusted values equals said difference.

3. The method of constructing a piecewise linear engine performance model according to claim 2, wherein the magnitudes of the respective adjustments are weighted according to the values of the integrated partial derivatives δy.

4. The method of constructing a piecewise linear engine performance model according to claim 1, further comprising, between steps (c) and (d), the step (c-ii) of:
for each of the engine power conditions, using the non-linear engine performance model to determine partial derivatives δx of the engine state variables x with respect to the engine control variables u, the values of the partial derivatives δx being determined so that, on integrating the partial derivatives δx, the error between steady state values for the engine state variables x calculated by the non-linear engine performance model and steady state values for the engine state variables x calculated from the integrated partial derivatives δx is reduced or eliminated; and
wherein, in step (d), the piecewise linearised engine performance model is constructed such that calculation of the engine state variables x involves combining each of the engine control variables u with the respective partial derivative δx.

5. The method of constructing a piecewise linear engine performance model according to claim 4, wherein there are two partial derivatives δx for each engine state variable x, and, in step (c-ii), the partial derivatives δx are determined for each engine state variable x by the sub-steps of:
(i) calculating a value of a first of the partial derivatives δx from the non-linear engine performance model, the model being at steady state;
(ii) integrating the first partial derivative δx;
(iii) calculating a steady state value for the corresponding engine state variable x from the non-linear engine performance model;
(iv) calculating the difference between the integrated first partial derivative δx and the calculated steady state value for the corresponding engine state variable x; and
(v) setting the value of the second partial derivative δx so that the integrated second partial derivative δx is equal to said difference.

6. The method of constructing a piecewise linear engine performance model according to claim 4, wherein there are three or more partial derivatives δx for each engine state variable x, and, in step (c-ii), the partial derivatives δx are determined for each engine state variable x by the sub-steps of:
(i) calculating values for the partial derivatives δx from the non-linear engine performance model, the model being at steady state;
(ii) integrating the partial derivatives δx;
(iii) calculating a steady state value for the corresponding engine state variable x from the non-linear engine performance model;
(iv) calculating the difference between one of the integrated partial derivatives δx and the calculated steady state value for the corresponding engine state variable x; and
(v) adjusting the values of the other of the integrated partial derivatives δx so that the sum of the adjusted values equals said difference.

7. The method of constructing a piecewise linear engine performance model according to claim 6, wherein the magnitudes of the respective adjustments are weighted according to the values of the integrated partial derivatives δx.

8. The method of constructing a piecewise linear engine performance model according to claim 4, wherein the piecewise linearised engine performance model is represented by the expressions:

$$\dot{x}/A = x - Gu \text{ and}$$

$$y = Cx + Du,$$

u, x and y being vectors respectively corresponding to the engine control variables u, the engine state variables x and the engine performance variables y, $\dot{x}$ being a vector corresponding to the time derivatives of the engine state variables x, and A, G, C and D being matrices of partial derivatives; and
wherein the partial derivatives δx of the engine state variables x with respect to the engine control variables u are components of matrix G.

9. The method of constructing a piecewise linear engine performance model according to claim 1, wherein in step (b) the engine power conditions define one or more power curves.

10. The method of constructing a piecewise linear engine performance model according to claim 9, wherein the engine is a gas turbine engine, and each power curve has a respective Mach number.

11. The method of constructing a piecewise linear engine performance model according to claim 1, wherein the piecewise linearised engine performance model is represented by the expressions:

$$\dot{x}/A = x - Gu \text{ and}$$

$$y = Cx + Du,$$

u, x and y being vectors respectively corresponding to the engine control variables u, the engine state variables x and the engine performance variables y, $\dot{x}$ being a vector corresponding to time derivatives of the engine state variables x, and A, G, C and D being matrices of partial derivatives.

12. The method of constructing a piecewise linear engine performance model according to claim 11, wherein the partial derivatives δy of the engine performance variables y with respect to the engine control variables u are components of matrix D, and the partial derivatives δy of the engine performance variables y with respect to the engine state variables x are components of matrix C.

13. The method of constructing a piecewise linear engine performance model according to claim 11, wherein partial derivatives of the time derivatives of the engine state variables x with respect to the engine state variables x are components of matrix A.

14. The method of constructing a piecewise linear engine performance model according to claim 1, wherein the engine is a gas turbine engine.

15. The method of constructing a piecewise linear engine performance model according to claim 14, wherein the engine state variables x include one or more engine shaft speeds.

16. The method of constructing a piecewise linear engine performance model according to claim 14, wherein the engine control variables u include either or both of the combustor inlet fuel flow rate, and an engine inlet variable stator vane angle.

17. The method of constructing a piecewise linear engine performance model according to claim 14, wherein the engine performance variables y include any one or more of an engine compressor delivery pressure, an engine turbine exhaust gas temperature, and an engine pressure ratio.

18. A method of constructing a piecewise linear engine performance model, comprising the steps of:
(a) providing a non-linear engine performance model which iteratively calculates engine performance variables y from one or more engine state variables x and one or more engine control variables u;
(b) defining a plurality of engine power conditions, each engine power condition being defined by at least one of the engine state variables x;
(c) representing the non-linear engine performance model by the state space equations:

$\dot{x} = f(x,u,t)$ and $y = h(x,u,t)$, f and h being non-linear functions, t being time, u, x and y being vectors respectively corresponding to the engine control variables u, the engine state variables x and the engine performance variables y, and $\dot{x}$ being a vector corresponding to the time derivatives of the engine state variables x, and, for each of the engine power conditions, using the non-linear engine performance model to determine, via a processor, respective partial derivatives for one or more of the engine state variables x, the engine performance variables y, and the time derivatives of the engine state variables x;
(d) performing, for at least one of the partial derivatives determined at step (c), the sub-steps of:
(i) displaying, in a first plot on a display device, values for the partial derivative against engine power condition;
(ii) displaying, on the display device, a second plot of the gradient of the first plot against engine power condition; and
(iii) using the plots to adjust one or more of the values for the partial derivative, delete one or more of the values for the partial derivative, and/or add one or more values for the partial derivative at further engine power conditions; and
(e) constructing, via the processor, a piecewise linearised engine performance model in which calculation of the engine performance variables y involves combining the engine control variables u and the engine state variables x with the respective partial derivatives.

19. The method of constructing a piecewise linear engine performance model according to claim 18, wherein the first and second plots are adjacently displayed on the display device.

20. A computer system comprising the processor, a non-transitory computer-readable storage medium, and the display device, the computer system programmed to run a piecewise linear engine performance model constructed according to claim 18, wherein the processor is configured to determine the respective partial derivatives for one or more of the engine state variables x, the engine performance variables y, and the time derivatives of the engine state variables x, and to construct the piecewise linearised engine performance model, and the computer-readable storage medium is configured to store a computer program for constructing the piecewise linearised engine performance model.

21. A computer system comprising a processor, the computer system arranged to construct a piecewise linear engine performance model by performing the steps of:
(a) interfacing to a non-linear engine performance model which iteratively calculates engine performance variables y from one or more engine state variables x and one or more engine control variables u;
(b) receiving a plurality of engine power conditions, each engine power condition being defined by at least one of the engine state variables x;
(c) representing the non-linear engine performance model by the state space equations:

$\dot{x} = f(x,u,t)$ and $y = h(x,u,t)$, f and h being non-linear functions, t being time, u, x and y being vectors respectively corresponding to the engine control variables u, the engine state variables x and the engine performance variables y, and $\dot{x}$ being a vector corresponding to the time derivatives of the engine state variables x, and, for each of the engine power conditions, using the non-linear engine performance model to determine, via the processor, respective partial derivatives for one or more of the engine state variables x, the engine performance variables y, and the time derivatives of the engine state variables x;
(d) performing, for at least one of the partial derivatives determined at step (c), the sub-steps of:
(i) displaying, in a first plot, values for the partial derivative against engine power condition;
(ii) displaying a second plot of the gradient of the first plot against engine power condition; and
(iii) using the first and second plots to adjust one or more of the values for the partial derivative, delete one or more of the values for the partial derivative, and/or add one or more values for the partial derivative at further engine power conditions; and
(e) constructing, via the processor, a piecewise linearised engine performance model in which calculation of the engine performance variables y involves combining the engine control variables u and the engine state variables x with the respective partial derivative.

\* \* \* \* \*